United States Patent
Hahn et al.

(10) Patent No.: US 12,246,795 B2
(45) Date of Patent: Mar. 11, 2025

(54) INTERFACE FOR ELECTRIC ASSIST BICYCLE

(71) Applicant: SRAM, LLC, Chicago, IL (US)

(72) Inventors: Sage Hahn, Chicago, IL (US); Sven Baumann, Grettstadt (DE); Dominique Fuss, Euerdorf (DE); Jochen Bierwerth, Arnstein (DE)

(73) Assignee: SRAM, LLC, Chicago, IL (US)

( * ) Notice: Subject to any disclaimer, the term of this patent is extended or adjusted under 35 U.S.C. 154(b) by 831 days.

(21) Appl. No.: 17/101,627

(22) Filed: Nov. 23, 2020

(65) Prior Publication Data
US 2021/0155315 A1    May 27, 2021

Related U.S. Application Data

(60) Provisional application No. 62/940,354, filed on Nov. 26, 2019.

(51) Int. Cl.
*B62M 6/50* (2010.01)
*B62J 1/08* (2006.01)
(Continued)

(52) U.S. Cl.
CPC .............. *B62M 6/50* (2013.01); *B62J 1/08* (2013.01); *B62J 43/13* (2020.02); *B62J 43/30* (2020.02);
(Continued)

(58) Field of Classification Search
CPC .......... B62M 6/50; B62M 9/04; B62M 25/00; B62M 6/15; B62J 1/08; B62J 43/13; B62J 43/30; B62J 45/20; B62J 45/412; B62J 50/22; B62J 50/225; B62J 99/00; B62K 11/14; B62K 25/04; B62K 19/30; G06F 3/02; G09G 5/10; G09G 5/37; G09G 2320/0626; G09G 2354/00;
(Continued)

(56) References Cited

U.S. PATENT DOCUMENTS 6,352,486 B1    3/2002   Wesling
9,491,788 B1 *  11/2016  Kasai ................. H04W 4/80
(Continued)

FOREIGN PATENT DOCUMENTS

CN       101016076         8/2007
CN       204916028 U   *  12/2015
(Continued)

OTHER PUBLICATIONS

Revuelta et al.; New Architecture for Electric Bikes Control Based on Smartphones and Wireless Sensors; Trends in Pract. Appl. of Scalable Multi-Agent Syst., the PAAMS Collection; Springer Intl. Publ.; 2016; pp. 125-134 (Year: 2016).*
(Continued)

*Primary Examiner* — Michael J Zanelli

(57) ABSTRACT

An e-bike interface is a hybrid wired/wireless e-bike control system that integrates wireless bicycle components into operation of an e-bike. The e-bike interface provides a frame-mounted control and display that is wired to, for example, an assist motor and a battery, and provides a wireless communication bridge between wireless bicycle components and corresponding wireless controls located on a handlebar.

22 Claims, 11 Drawing Sheets

(51) Int. Cl.

| | |
|---|---|
| *B62J 43/13* | (2020.01) |
| *B62J 43/30* | (2020.01) |
| *B62J 45/20* | (2020.01) |
| *B62J 45/412* | (2020.01) |
| *B62J 50/21* | (2020.01) |
| *B62J 50/22* | (2020.01) |
| *B62K 11/14* | (2006.01) |
| *B62K 25/04* | (2006.01) |
| *B62M 9/04* | (2006.01) |
| *B62M 25/00* | (2006.01) |
| *G06F 3/02* | (2006.01) |
| *G09G 5/10* | (2006.01) |
| *G09G 5/37* | (2006.01) |

(52) U.S. Cl.
CPC ............ *B62J 45/20* (2020.02); *B62J 45/412* (2020.02); *B62J 50/22* (2020.02); *B62J 50/225* (2020.02); *B62K 11/14* (2013.01); *B62K 25/04* (2013.01); *B62M 9/04* (2013.01); *B62M 25/00* (2013.01); *G06F 3/02* (2013.01); *G09G 5/10* (2013.01); *G09G 5/37* (2013.01); *G09G 2320/0626* (2013.01); *G09G 2354/00* (2013.01); *G09G 2360/144* (2013.01)

(58) Field of Classification Search
CPC ... G09G 2360/144; Y02T 10/72; B60L 15/20; B60L 2200/46; G08C 17/02
See application file for complete search history.

(56) References Cited

U.S. PATENT DOCUMENTS

| | | | |
|---|---|---|---|
| 9,561,734 B2 | 2/2017 | Watarai | |
| 9,682,743 B2* | 6/2017 | Miyoshi | B62J 50/22 |
| 10,023,139 B2 | 7/2018 | Watarai et al. | |
| 10,472,015 B1 | 11/2019 | Sonderegger | |
| 2012/0253601 A1 | 10/2012 | Ichida | |
| 2014/0181715 A1* | 6/2014 | Axelrod | H04M 1/72454 715/771 |
| 2015/0073656 A1* | 3/2015 | Takamoto | G06F 9/02 701/1 |
| 2016/0216169 A1 | 7/2016 | Tetsuka | |
| 2017/0043829 A1 | 2/2017 | Li | |
| 2017/0355412 A1* | 12/2017 | Takeshita | B62J 11/00 |
| 2018/0156660 A1* | 6/2018 | Turgeon | G01J 1/44 |
| 2019/0002053 A1 | 1/2019 | Kakinoki | |
| 2019/0031283 A1* | 1/2019 | Suzuki | B62M 6/55 |
| 2019/0106178 A1 | 4/2019 | Shimano | |
| 2020/0377167 A1 | 12/2020 | Suzuki | |
| 2021/0031881 A1* | 2/2021 | Tetsuka | B62M 9/132 |

FOREIGN PATENT DOCUMENTS

| | | | | |
|---|---|---|---|---|
| CN | 106080937 | | 11/2016 | |
| CN | 205686519 U | * | 11/2016 | |
| CN | 205827889 U | * | 12/2016 | |
| CN | 105270558 B | * | 9/2018 | |
| CN | 209142297 U | * | 7/2019 | |
| DE | 102016001909 A1 | * | 9/2016 | ............ B62J 43/13 |
| EP | 1449755 | | 12/2005 | |
| EP | 3127799 | | 2/2017 | |
| EP | 3851365 | | 11/2023 | |
| JP | 2017090846 A | * | 5/2017 | |
| JP | 6425762 B2 | * | 11/2018 | ............ B60K 35/00 |
| KR | 20170094908 A | * | 8/2017 | ............ B62M 6/50 |
| TW | 201507925 | | 3/2015 | |
| TW | 201637933 | | 11/2016 | |
| TW | 201713127 | | 4/2017 | |
| TW | 201927617 | | 7/2019 | |
| WO | WO-0046797 A1 | * | 8/2000 | ............ B60Q 1/503 |
| WO | 2014205345 | | 12/2014 | |
| WO | 2019043576 | | 3/2019 | |

OTHER PUBLICATIONS

Revuelta et al.; Wireless controller and smartphone based interaction system for electric bicycles; Advances in Distributed Computing and Artificial Intelligence Journal; ADCAIJ, Regular Issue, vol. 4 n.4 (2015); pp. 59-67 (Year: 2015).*

Overholt, Zach, Specialized Recharges Turbo Levo e-MTB w/ added range, power, less weight, more, Website: https://bikerumor.com/specialized-recharges-turbo-levo-e-mtb-w-added-range-power-less-weight-more/ last checked Jul. 27, 2023.

Shimano Steps Satellite System On/Off Switch for E-Bike, Website: https://bike.shimano.com/en-EU/product/component/mtb-ebike-e8000/EW-SW100.html last checked Jul. 27, 2023.

Robert Bosch Gmbh, Active Line/Performance Line, Apr. 19, 2017, pp. 1-98, p. 12-19.

Specialized: "Specialized Turbo Levo User Manual", Morgan Hill, Ca, Nov. 1, 2018 (Nov. 1, 2018) pp. 1-224, XP093205613, Morgan Hill, Ca Retrieved from the Internet: U RL:https ://media.specializedcollateral/00001 08696. pdf.

* cited by examiner

INTERFACE FOR ELECTRIC ASSIST BICYCLE

PRIORITY

This application claims the benefit of U.S. Provisional Patent Application No. 62/940,354, filed Nov. 26, 2019, which is hereby incorporated by reference in its entirety.

FIELD OF THE DISCLOSURE

The present disclosure is generally directed to a human machine interface (HMI) and, more particularly, to an HMI for an e-bike.

DESCRIPTION OF RELATED ART

Electric drive systems are used to assist a rider of a bicycle to ride longer and/or faster. An assist motor and a battery are added to the bicycle to accomplish this as an electric bike (e.g., an e-bike). One type of e-bike requires pedaling to start the assist motor. A pedal force or pedal rotation is measured, and a controller of the e-bike controls the assist motor based on the measured pedal force or the measured pedal rotation. For example, the assist motor may be positioned on a frame of the e-bike, and the assist motor may provide motor assist at cranks of the e-bike. The motor assist may be provided based on the measured pedal force or the measured pedal rotation, such that a combined power of a power generated by the assist motor and a drive power input generated by the rider goes through a geared drivetrain of the e-bike.

SUMMARY

In one example, an interface includes a housing attachable to a first frame part of a bicycle, and a processor supported by the housing. The interface also includes a first communication interface and a second communication interface in communication with the processor. The first communication interface is a wired communication interface, and the second communication interface is a wireless communication interface. The interface includes an input in communication with the processor and supported by the housing. The input is configured to generate a first control signal based on a first user input. The processor is configured to receive a second control signal via the second communication interface. The second control signal is generated by a control device attached to a second frame part of the bicycle based on a second user input. The processor is also configured to control a component of the bicycle via the first communication interface based on the first control signal and the received second control signal.

In one example, the first frame part is a top tube of the bicycle, and the second frame part is a handlebar of the bicycle.

In one example, the input is a physical user interface.

In one example, the processor is further configured to receive data representing characteristics related to the component of the bicycle from the component of the bicycle via the first communication interface.

In one example, the interface further includes an output in communication with the processor. The output is configured to output a representation of at least one of the characteristics related to the component of the bicycle.

In one example, the output is a display supported by the housing. The display is configured to display the representation of the at least one characteristic related to the component of the bicycle.

In one example, the interface further includes an ambient light sensor configured to determine an amount of ambient light in an environment in which the interface is disposed. The processor is configured to change a brightness of the display based on the determined amount of ambient light in the environment.

The component of the bicycle is an e-bike motor system. The e-bike motor system includes a drive motor and a battery. The characteristics related to the e-bike motor system includes battery power, a time to complete a charge, a charge rate, a percent state of charge, power level, speed, cadence, a system warning or error message, or any combination thereof.

In one example, the component of the bicycle is an e-bike motor system. The e-bike motor system includes a drive motor and a battery. The processor is configured to be powered by the battery of the e-bike motor system via the first communication interface.

In one example, the e-bike motor system further includes a drive motor. The processor is configured to control the drive motor of the e-bike motor system via the first communication interface based on the first control signal or the received second control signal.

In one example, the control of the drive motor of the e-bike motor system based on the first control signal or the received second control signal comprises the processor being configured to turn the drive motor on or off, or change a power level of the drive motor.

In one example, the control device attached to the second frame part of the bicycle is a wireless handlebar mounted e-bike control interface, a wireless handlebar mounted shifter or seat post control interface, a wireless handlebar mounted e-bike assist level control interface, or a wireless handlebar mounted automatic shifting control interface.

In one example, the component is a first component. The processor is further configured to receive data from a second component of the bicycle, transmit data to the second component of the bicycle, or receive and transmit data to the second component of the bicycle.

In one example, the interface further includes a third communication interface in communication with the processor. The third communication interface is a wireless communication interface. The processor is configured to receive the second control signal via the second communication interface using a first wireless communication protocol. The processor is configured to receive data from the second component of the bicycle, transmit data to the second component of the bicycle, or receive and transmit data to the second component of the bicycle via the third communication interface using a second wireless communication protocol. The second wireless communication protocol is different than the first wireless communication protocol.

In one example, the second component of the bicycle is a wirelessly controlled derailleur, a wirelessly controlled front suspension fork, or a rear suspension shock.

In one example, the component is a first component, and the first component receives a timed digital pulse from a speed sensor, the speed sensor communicates to the processor via the first communication interface.

In one example, the processor is configured to communicate with a device outside of the bicycle via the second communication interface or a third communication interface. The third communication interface is different than the second communication interface and is a wireless communication interface. The processor is further configured to determine whether a signal from the device outside of the bicycle is received and allow operation of the component of the bicycle when the signal is received from the device outside of the bicycle.

In one example, the device outside of the bicycle is a passive wireless electronic device or a mobile device.

In one example, a bicycle communication apparatus for an e-bike includes a housing attachable to a top tube of a frame of a bicycle, a processor supported by the housing, and a wired communication interface in communication with the processor. The wired communication interface is wiredly connectable to an e-bike motor system. The e-bike motor system includes a drive motor. The bicycle communication apparatus further includes a wireless communication interface in communication with the processor. The wireless communication interface is wirelessly connectable to a control device attached to a handlebar of the bicycle. The bicycle communication apparatus includes an input supported by the housing and in communication with the processor. The input is configured to generate a first control signal based on a first user input. The processor is configured to receive a second control signal from the control device attached to the handlebar of the bicycle via the wireless communication interface. The second control signal is for the e-bike motor system and is generated by the control device based on a second user input. The processor is further configured to control the drive motor of the e-bike motor system via the wired communication interface based on the first control signal or the received second control signal.

In one example, the wireless communication interface is a first wireless communication interface. The bicycle communication apparatus further includes a second wireless communication interface. The second wireless communication interface is in communication with the processor and is wirelessly connected to a movable component of the bicycle. The movable component of the bicycle is movable relative to the bicycle communication apparatus. The processor is in communication with the control device attached to the handlebar of the bicycle and the movable component of the bicycle using different wireless protocols, respectively.

In one example, an e-bike system for a bicycle includes an e-bike motor system including a drive motor and a battery. The e-bike system also includes a bicycle communication apparatus. The bicycle communication apparatus includes a housing attachable to a frame of the bicycle, a processor supported by the housing, and a wired communication interface in communication with the processor. The wired communication interface is wiredly connected to the e-bike motor system. The bicycle communication apparatus also includes a wireless communication interface in communication with the processor. The wireless communication interface is wirelessly connectable to a control device attached to a handlebar of the bicycle. The bicycle communication apparatus includes an input supported by the housing and in communication with the processor. The input is configured to generate a first control signal based on a first user input. The processor of the bicycle communication apparatus is configured to receive a second control signal from the control device attached to the handlebar of the bicycle via the wireless communication interface. The second control signal is generated by the control device based on a second user input. The processor of the bicycle communication apparatus is further configured to control the drive motor of the e-bike motor system via the wired communication interface based on the first control signal or the received second control signal.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

Figure 1:
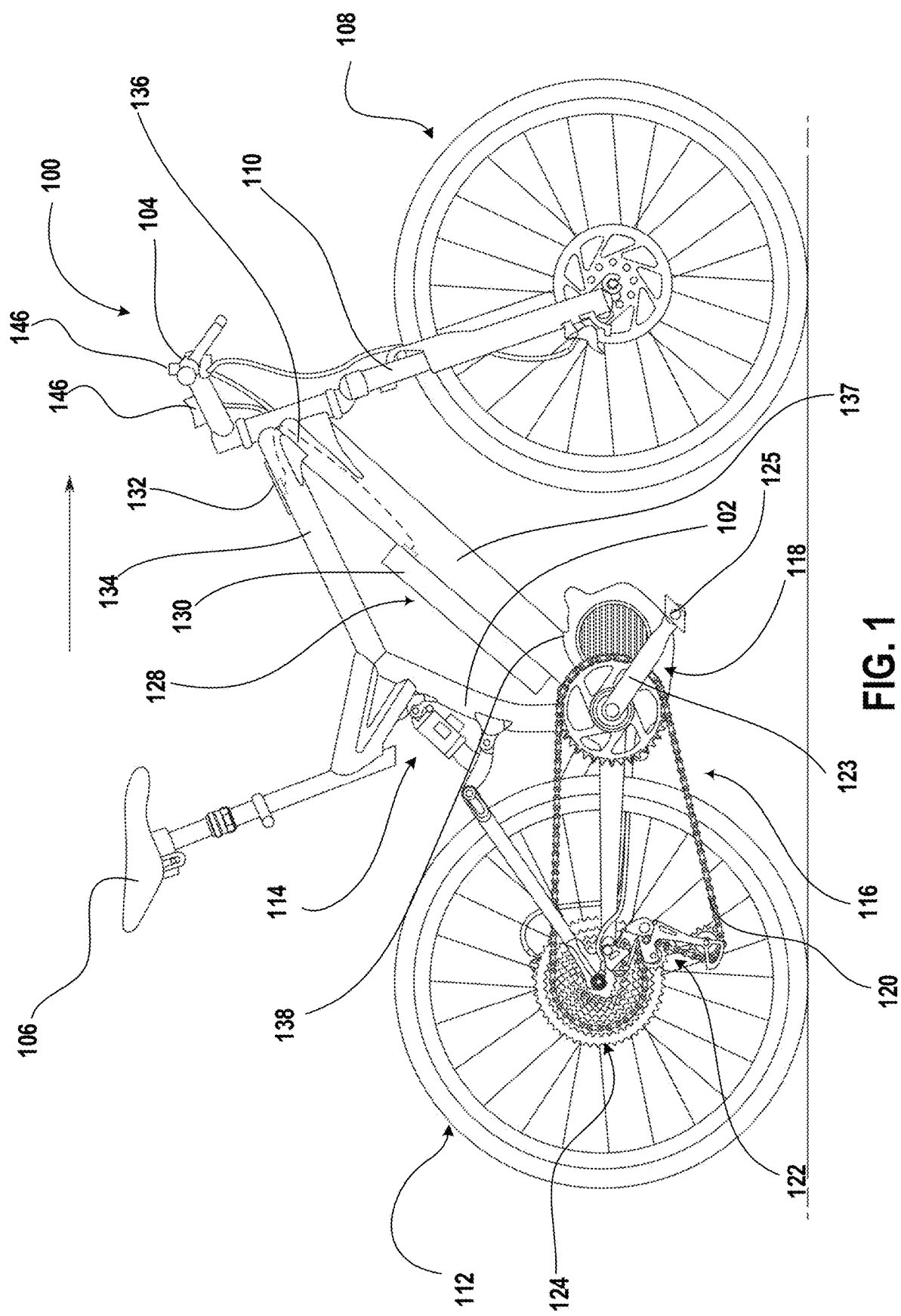
FIG. 1 is a side view schematic of an e-bike that may be fitted with an interface in accordance with the teachings of this disclosure.

A number of peripheral inputs are provided for control of an assist motor of an e-bike. Inputs such as, for example, power on/off, a power assist level, a battery level, and/or other inputs may be provided. Additionally, characteristics of the assist motor and the battery of the e-bike are to be displayed while the rider rides the e-bike. Characteristics such as, for example, battery level, a power setting, a gear indication, a speed, a cadence, a power, and/or other characteristics may be displayed to the rider.

The rider is to be able to control the peripheral inputs and view the displayed characteristics while riding the e-bike (e.g., via a display). For e-bikes of the prior art, the peripheral inputs and the display may be located on the handlebar and may be a wired connection to a control system of the e-bike.

Running a wire between the peripheral inputs and the display on the handlebar, and the e-bike system (e.g., including the battery and/or the assist motor) on the frame, however, is complex and runs a risk of failure due to movement of the handlebar, and thus the peripheral inputs and the display attached thereto, relative to the frame. The peripheral inputs and the display also compete for space if installed on the handlebar, as a full-featured mapping computer may also be installed on the handlebar.

Other bicycle components are to be integrated into operation of the e-bike (e.g., the assist motor). The other bicycle components include, for example, electrically controlled derailleurs, gear hubs, suspension devices, height adjust seat posts, lights, audible devices, power meters, computing devices, other sensors such as cadence sensors, wheel speed sensors, inclination sensors, wind speed sensors, direction sensors, altitude sensors, seat pressure sensors, post height sensors, pedal force sensors, and/or other components. These bicycle components may be controlled wirelessly, as wires are a major source of failure on bicycle components (e.g., off-road mountain bicycles). The wireless bicycle components may be controlled by corresponding wireless controls located on the handlebar.

The e-bike interface (e.g., a bicycle communication apparatus (BCA)) of the present embodiments is a hybrid wired/wireless e-bike control system that integrates wireless bicycle components into operation of an e-bike. The e-bike interface provides a frame-mounted control and display that is wired to, for example, the assist motor and the battery, and provides a wireless communication bridge between wireless bicycle components and corresponding wireless controls located on the handlebar.

The e-bike interface may be configured to turn part of an e-bike system (e.g., the assist motor) on and off. The e-bike interface is further configured to display characteristics of the e-bike system such as, for example, battery power, gear indication, power level, speed, cadence, system warnings or error messages, and/or other information. A rider is able to change the power level for the e-bike system (e.g., the power level for the assist motor) via the e-bike interface. The e-bike interface acts as a communication bridge between a controller area network bus (CANBUS) of the wired e-bike system and a number of wireless components integrated into the function of the e-bike system. Examples of such wireless components include wireless handlebar-mounted walk to boost buttons, a wirelessly controlled rear derailleur, wireless handlebar-mounted shifter and seat post control units, a wirelessly controlled front suspension fork and/or a wirelessly controlled rear suspension shock, a wireless handlebar-mounted assist level button, and/or a wireless handlebar-mounted automatic shifting setting button.

Turning now to the drawings, FIG. 1 generally illustrates one example of a bicycle 100 on which the disclosed interface may be implemented. In this example, the bicycle 100 may be a mountain bicycle. In some cases, the bicycle 100 may be an e-bike. The bicycle 100 has a frame 102, a handlebar 104 near a front end of the frame 102, and a seat or saddle 106 for supporting a rider over a top of the frame 102. The bicycle 100 also has a first or front wheel 108 carried by a front fork 110 of the frame 102 and supporting the front end of the frame 102. The bicycle 100 also has a second or rear wheel 112 supporting a rear end of the frame 102. The rear end of the frame 102 may be connected to a rear suspension component 114. The bicycle 100 also has a drive train 116 with a crank assembly 118 that is operatively coupled via a chain 120 and a rear derailleur 122 to a rear cassette 124 near a rotation axis of the rear wheel 112. The crank assembly 118 includes two cranks 123 and two pedals 125 connected to the two cranks 123, respectively, on opposite sides of the frame 102 of the bicycle 100.

In the example shown, the rear derailleur 122 includes a power source (e.g., a battery) and a motor, and receives instructions (e.g., wirelessly) from a controller 126 (e.g., a shifter or a central controller) mounted, for example, to the handlebar 104 or an interface of the present embodiments to shift gears on the rear cassette 124. In one embodiment, the rear derailleur 112 receives instructions from an e-bike control system 128 (e.g., including one or more processors, control circuitry, and/or a power source 130) to shift gears on the rear cassette 124. The rear derailleur 122 shift gears using the power source and the motor of the rear derailleur 122, based on the received instructions.

In one embodiment, the rear derailleur 122 is powered by a power source outside of the rear derailleur 122. For example, the rear derailleur 122 is powered by the power source 130 (e.g., a battery) of the e-bike control system 128. In another embodiment, the rear derailleur 122 is connected to an input on the handlebar 104 (e.g., a shifter), for example, via a shifter cable and shifts gears on the rear cassette 122 based on movement of the shifter (e.g., by the rider), and thus the shifter cable.

An interface 132 (e.g., a human machine interface (HMI)) may be mounted to the frame 102 of the bicycle 100. For example, the interface 132 may be mounted to a top tube 134 of the frame 102. The interface 132 may be coupled with the power source 130 (e.g., a battery) of the e-bike control system 128 via a wire 136 (e.g., a bus).

The battery 130 of the e-bike control system 128 is also supported by the frame 102 of the bicycle 100. For example, the battery 130 of the e-bike control system 128 is supported by a bottom tube 137 of the frame 102 of the bicycle 100. The wire 136 extends, for example, through part of the bottom tube 137 of the frame 102 and part of the top tube 134 of the frame to electrically connect the e-bike control system 128 (e.g., the battery 130) and the interface 132. Other components (e.g., the controller 126) may be coupled with the power source 130 of the e-bike control system 128 via other wires, respectively.

In some cases, the wire 136 may be sealed where the wire 136 exits the frame 102 of the bicycle 100. For example, epoxy or another sealing material may be disposed around the wire 136 where the wire 136 exits the frame 102. The material may form a potting seal around the wire 136. The sealing prevents ingress of water into the frame 102 of the bicycle 100 from outside of the frame 102. Additionally or alternatively, the sealing may reduce strain on the wire 136.

The power source 130 powers the interface 132 via the wire 136. The interface 132 may also receive data (e.g., instructions) from and/or send data to other components of the e-bike control system 128 (e.g., the one or more processors and/or the control circuitry) via the wire 136.

The power source 130 also powers a drive unit 138 (e.g., including an e-bike motor) that is operatively coupled to the crank assembly 118. In one embodiment, the interface 132 may also be powered by a separate battery to provide access to e-bike controls when the battery 130 of the e-bike control system 128 is not attached to the bicycle 100. The interface 132 may also be in communication with multiple external wireless devices with or without the battery 130 of the e-bike control system 128 being attached.

While the bicycle 100 depicted in FIG. 1 is a mountain bicycle, the interface 132, including the specific embodiments and examples disclosed herein as well as alternative embodiments and examples, may be implemented on other types of bicycles. For example, the disclosed interface 132 may be used on road bicycles, as well as bicycles with mechanical (e.g., cable, hydraulic, pneumatic, etc.) and non-mechanical (e.g., wired, wireless) drive systems. The disclosed interface 132 may also be implemented on other types of two-, three-, and four-wheeled human powered vehicles as well.

Figure 2:
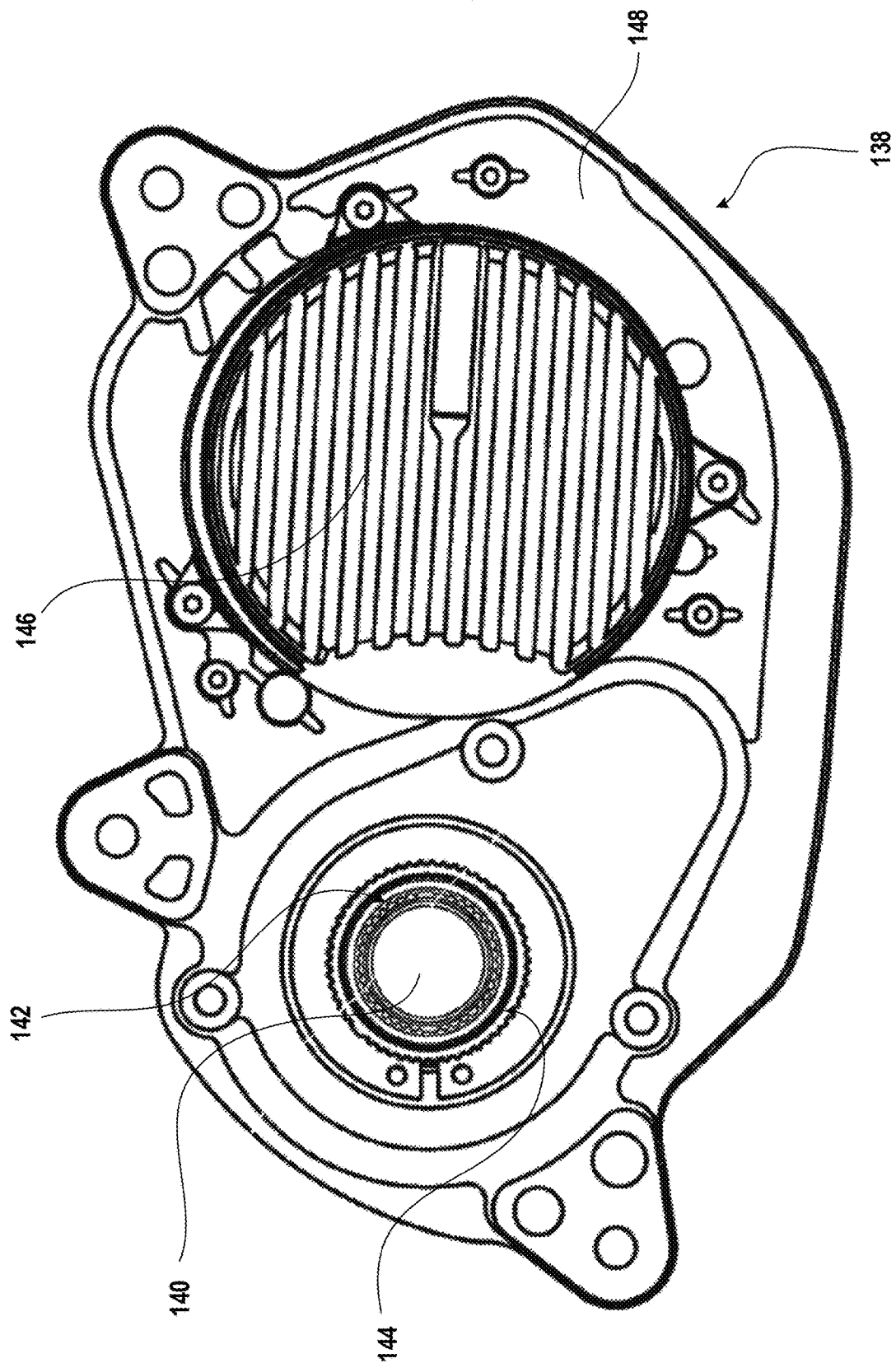
FIG. 2 is a side view schematic of an example of a drive unit.

The drive unit 138 is mounted to the frame 102 of the bicycle 100. For example, the drive unit 138 is mounted to the frame 102 of the bicycle 100 with one or more bolts and threaded openings within the frame 102 of the bicycle 100. The drive unit 138 may be attached to the frame 102 in other ways. Referring to FIG. 2, a crank axle runs through an opening 140 through the drive unit 138 and connects the two cranks 123 of the crank assembly 118. During operation, the rider rotates the two cranks 123 via the two pedals 125, rotating the crank axle. The crank assembly 118 may include sensors configured to measure axle rotation and forces on the axle. At least some of the sensors may, for example, be disposed on and/or within the crank axle. The crank axle drives an output ring 142 of the drive unit 138 in a forward drive direction but not in a back pedaling direction through the use of, for example, a one-way clutch 144 between the crank axle and the output ring 142.

The measured axle rotation and the measured forces on the axle (e.g., by the sensors) may be used to control an electric drive motor 146 (e.g., an assist motor) of the drive unit 138. The assist motor 146 may directly or through the use of gears also drive rotation of output ring 142. The output ring 142 thus provides an output power to the drive train 116 that is a combination of rider input power and an output power of the assist motor 146.

The drive unit 138 may include internal electronics to control operation of the assist motor 146, measure axle inputs, measure an inclination of the bicycle 100, measure an acceleration of the bicycle 100, measure a temperature of the bicycle 100, and/or reduce a voltage of the battery 130 of the e-bike control system 128 to accommodate and power external devices if lower voltages are required. Additional, fewer, and/or different internal electronics may be provided within the drive unit 138.

A housing 148 of the drive unit 138 also acts as a heat sink to remove heat generated by the assist motor 146. The housing 148 of the drive unit 138 may be made of any number of different thermally conductive materials including, for example, aluminum. Aluminum is light and a good heat dissipater. Aluminum, however, is not good at passing wireless signals. A controller of the drive unit 138 may thus be disposed on the housing 148 of the drive unit 138 and wired to the internal electronics of the drive unit 138. The controller of the drive unit 138 may be made of a material through which wireless control signals may pass. In other embodiments, the housing 148 is made of a different thermally conductive material (e.g., a thermally conductive plastic) that is more transmissive to wireless signals than aluminum. In one embodiment, the controller of the drive unit 138 is wired to the e-bike control system 128.

Figure 3:
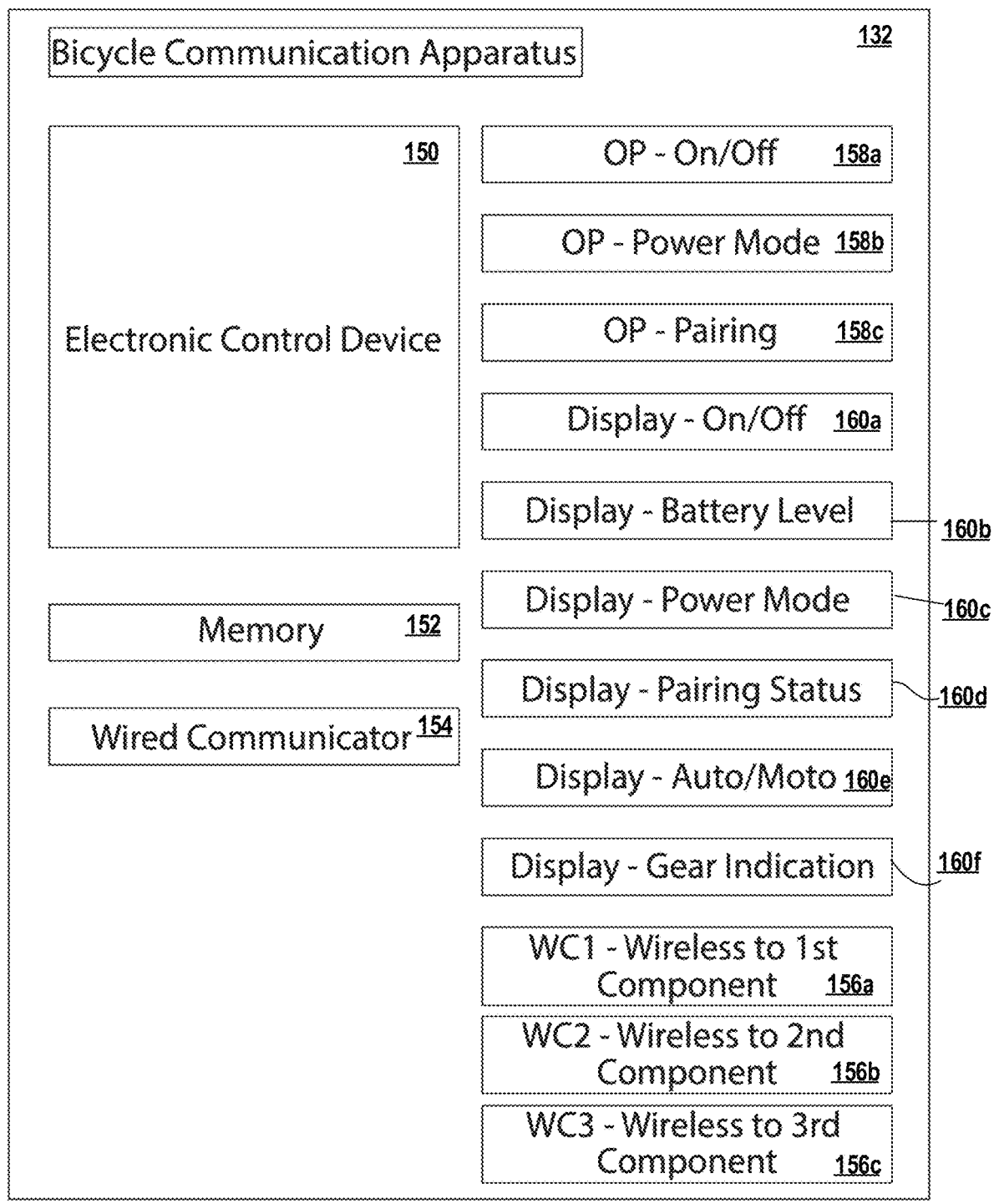
FIG. 3 is an exemplary representation of an interface.

Data from the drive unit 138 (e.g., the sensors of the drive unit 138) may be transmitted to the interface 132. FIG. 3 is a representation of one embodiment of the interface 132. As shown in the example of FIG. 1, the interface 132 may be wired to the e-bike control system 128 (e.g., the battery 130 of the e-bike control system 128). Alternatively or additionally, the interface 132 may be wired to the drive unit 138. The interface 132 may be powered directly from the battery 130 of the e-bike control system 128. The interface 132, however, may operate at a voltage lower than the battery 130 of the e-bike control system 128, and the e-bike control system 128, the interface 132, or another component of the bicycle 100 may include a voltage reducer and/or a voltage regulator configured to reduce the battery voltage and/or maintain the reduced voltage.

The interface 132 includes a controller 150 (e.g., an electronic control device), a memory 152, a wired interface 154 for communication with one or more wired devices, wireless interfaces 156 for communication with one or more wireless devices, inputs 158, and outputs 160. The controller 150, the memory 152, the wired interface 154, the wireless interfaces 156, the inputs 158, and the outputs 160 are supported by one or more housings of the interface 132. The interface 132 may include more, fewer, and/or different components. The controller 150, the memory 152, the wired interface 154, the wireless interfaces 156, the inputs 158, and the outputs 160 may be in communication with each other via one or more printed circuit boards (PCBs), wires, tracks, pads, and/or other components within the interface 132.

The controller 150 operates the interface 132 (e.g., determines what to display on the interface 132, generates instructions based on rider interaction with the inputs 158). The controller 150 may include any number of different types of controllers including, for example, a general processor, a central processing unit, a control processor, a graphics processor, a digital signal processor, an application-specific integrated circuit, a field-programmable gate array, a digital circuit, an analog circuit, combinations thereof, or other now known or later developed processing devices. The controller 150 is a single device or multiple devices operating in serial, parallel, or separately. The controller 150 is configured by instructions, design, hardware, and/or software to perform the acts discussed herein.

The memory 152 is configured to store data regarding e-bike settings, usage, or use, or identification of external paired devices. The memory 152 may also be configured to store data received from components of the bicycle 100 outside of the interface 132 (e.g., the rear derailleur 122, the e-bike control system 128, and the shifters on the handlebar 104). The memory 152 is a computer readable storage medium. The memory 152 may include various types of volatile and non-volatile storage media, including but not limited to random access memory, read-only memory, programmable read-only memory, electrically programmable read-only memory, electrically erasable read-only memory, flash memory, magnetic tape or disk, optical media, and the like. The memory 152 may be a single device or a combination of devices. The memory 152 may be adjacent to, part of, networked with, and/or remote from the processor 150.

The wired interface 154 may be any number of different wired interfaces that are configured to receive/transmit power and may be for any number of different wired communications on the bicycle 100. For example, the wired interface 154 may be a coaxial cable interface. More and/or different wired interfaces may be provided.

The interface 132 may use multiple wireless protocols with either a single transmitter or multiple different transmitters in addition to the wired communication protocol used within the e-bike motor/battery system. For example, the interface 132 may communicate with the rear derailleur 122 with a derailleur protocol, a handheld device with Bluetooth or BTLE, and a wireless fitness device with a low power protocol such as ANT or ANT+. More, fewer, and/or different wireless protocols may be used.

In the example shown in FIG. 3, the interface 132 includes three wireless interfaces 156a, 156b, 156c. For example, a first wireless interface 156a may be for communication with the rear derailleur 122 and/or the shifters on the handlebar 104, a second wireless interface 156b (e.g., a Bluetooth interface) may be for communication with the handheld device, and a third wireless interface 156c (e.g., an ANT+ interface) may be for communication with the wireless fitness device. In one embodiment, the interface 132 includes a single wireless interface configured to operate with the different wireless protocols. The interface 132 may include more, fewer, and/or different wireless interfaces. In one embodiment, the interface 132 includes an input (e.g., a button or other input) to pair the interface 132 with wireless components outside of the interface 132 on the bicycle 100 (e.g., the rear derailleur 122 and/or the shifters on the handlebar 104).

The controller 150 of the interface 132 acts as a bridge between the e-bike control system 128 and a user input (e.g., via the inputs 158 at the interface 132) and/or wireless devices (e.g., handlebar-mounted wireless control devices). The interface 132, via the controller 150 and the wireless interfaces 156, may communicate in multiple wireless protocols depending on the device the interface 132 is communicating with. For example, the interface 132 transforms signals to and from the e-bike control system 128, into a protocol that may be understood by the component receiving the signal (e.g., the e-bike control system 128, the rear derailleur 122, or a handlebar-mounted control device).

The interface 132 includes inputs 158 in the form of, for example, buttons, though other inputs 158 such as, for example, touch screen control or some other form of motion sensing through the use of sensors or cameras may be provided. In one embodiment, the buttons 158 of the interface 132, for example, may be dynamically backlit to be easier to find in dark conditions. The example of FIG. 3 shows three input buttons 158, though more or fewer may be provided.

The input buttons 158 may directly control components of the bicycle 100. For example, one or more of the input buttons 158 may directly control the drive unit 138 of the bicycle 100. In the example of FIG. 3, the input buttons 158 include a first input button 158a that turns the drive unit 138 on or off, and a second input button 158b that changes an output power mode of the drive unit 138 (e.g., low, medium, high, Turbo). The rider may, for example, press the second input button 158b a number of times until the output power mode of the drive unit 138 to be selected (e.g., high) is displayed at the interface 132.

The interface 132 includes outputs 160 in the form of displays, though other types of outputs 160 including, for example, audio outputs (e.g., speakers and/or a vibration circuit to indicate to the rider that particular configurations of the bicycle 100 have been reached, predetermined conditions have been met, and/or other occurrences) may be provided. The interface 132 may include one or more separate displays 160 (e.g., corresponding to different types of information to be displayed).

The example of FIG. 3 illustrates six different displayed outputs 160. More, fewer, and/or different displayed outputs and/or one or more audio outputs may be provided. For example, the example of FIG. 3 illustrates a first displayed output 160a that indicates whether the drive unit 138 is on or off. A second displayed output 160b indicates a battery level of a battery of the bicycle 100. For example, the second displayed output 160b indicates a battery level of the battery 130 of the e-bike control system 128. A third displayed output 160c indicates an output power mode of the drive unit 138 (e.g., low, medium, high, Turbo). A fourth displayed output 160d indicates whether the interface 132 is paired with one or more components of the bicycle 100 (e.g., shifters on the handlebar 104 and/or the controller of the drive unit 138). A fifth displayed output 160e indicates different modes of the bicycle 100 (e.g., Auto v. Moto). A sixth displayed output 160f indicates a gear in which the bicycle 100 is currently being ridden. In one embodiment, another output is displayed when the battery 130 of the e-bike 100 is charging. For example, the interface 132 may display information about a battery charge cycle such as a remaining time to complete charge, a charge rate, and/or a percent state of charge.

The displayed outputs 160 may be provided within a single display (e.g., a single LCD screen). Alternatively, the displayed outputs 160 may be broken into at least two groups displayed on at least two separate displays (e.g., two separate LCD screens).

Data based on which the displayed outputs 160 are generated may be transmitted to the interface 132 in any number of ways. For example, the data may be transmitted via the wire 136 and/or wirelessly from the corresponding components of the bicycle 100. For example, the e-bike control system 128 may identify and transmit the battery level of the battery 130, whether the drive unit 138 is on or off, and a power mode of the drive unit 138 via the wire 136; the shifters on the handlebar 104 or the rear derailleur 122, for example, may identify and transmit a gear indication to the interface 132 wirelessly. The data may be identified and transmitted at a predetermined time interval (e.g., every 0.1 second) and/or in response to a change (e.g., the drive unit 138 being turned on or off).

Figure 4:
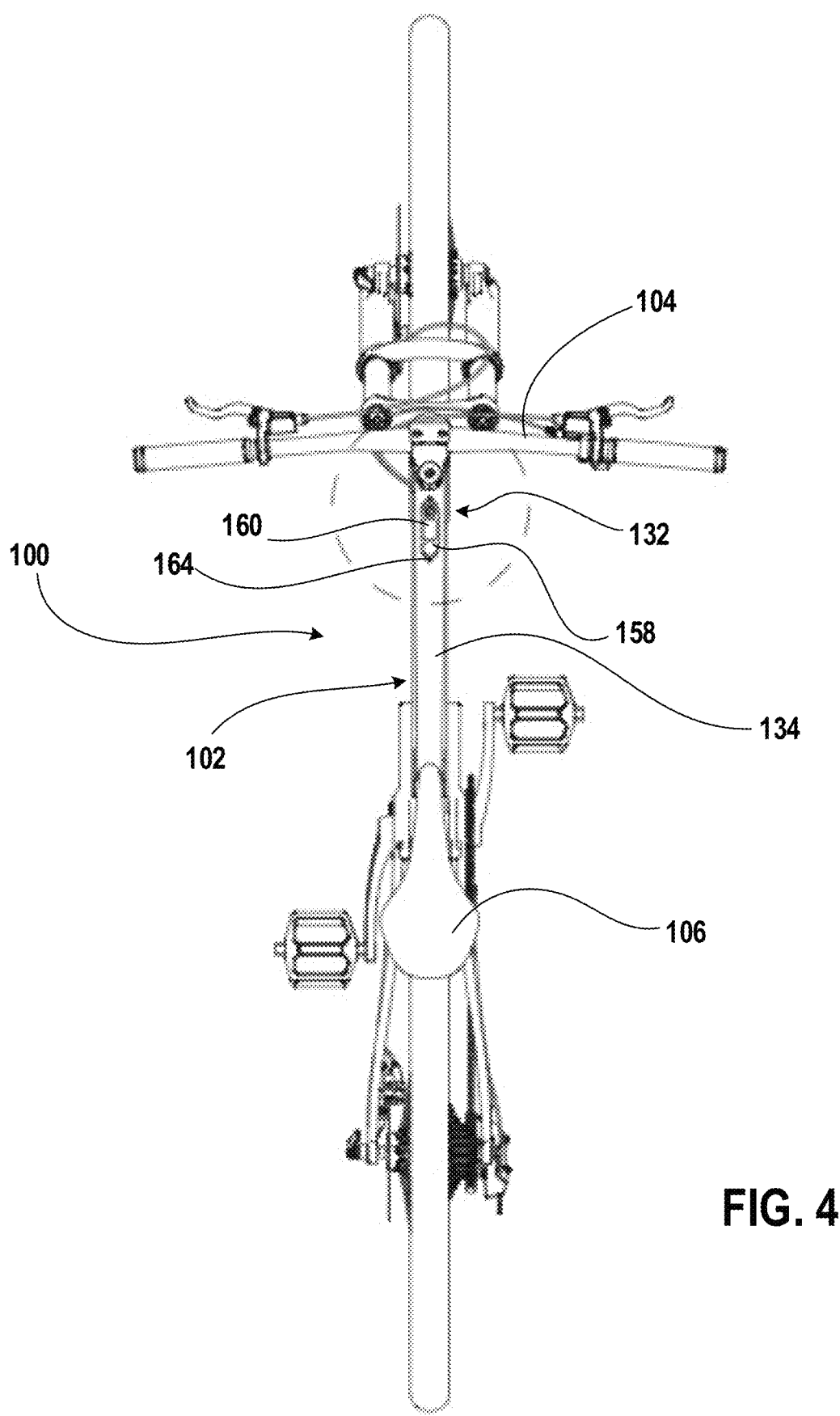
FIG. 4 in a top view schematic of the e-bike of FIG. 1.
Figure 5:
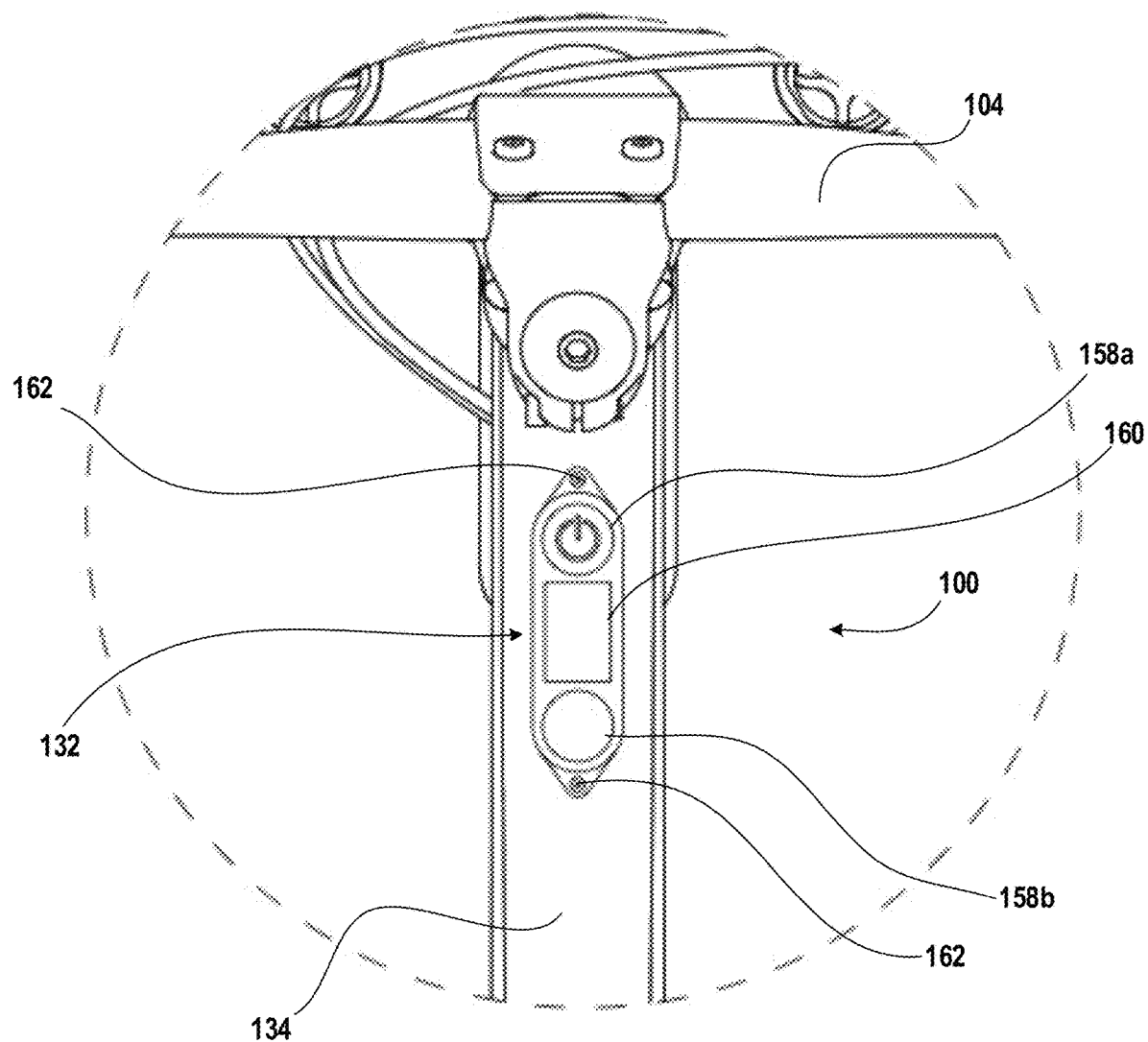
FIG. 5 is a close-up top view of a portion of the e-bike of FIG. 4.

Referring to FIGS. 4 and 5, the input buttons 158, for example, and the displayed outputs 160 of the interface 132 may be located at a position on the bicycle 100 where the rider may use the input buttons 158 and see the displayed outputs 160, respectively, during riding. As illustrated in the example of FIGS. 4 and 5, the interface 132 may be disposed on and/or in the top tube 134 of the frame 102 at a position along the top tube 134 of the frame 102 that is closer to the handlebar 104 than the saddle 106. Other positioning of the interface 132 along the top tube 134 or elsewhere on the frame 102 may be provided.

The interface 132 may be attached to the frame 102 of the bicycle 100 in any number of ways. For example, the top tube 134 of the frame 102 may include an opening sized and shaped to match at least a portion of the interface 132, and the interface 132 may be positioned within the opening. The top tube 134 may also include holes via which the interface 132 may be connected to the frame 102 with connectors 162 (e.g., screws). The interface 132 may be attached to the frame 102 of the bicycle 100 in other ways.

Figure 6:
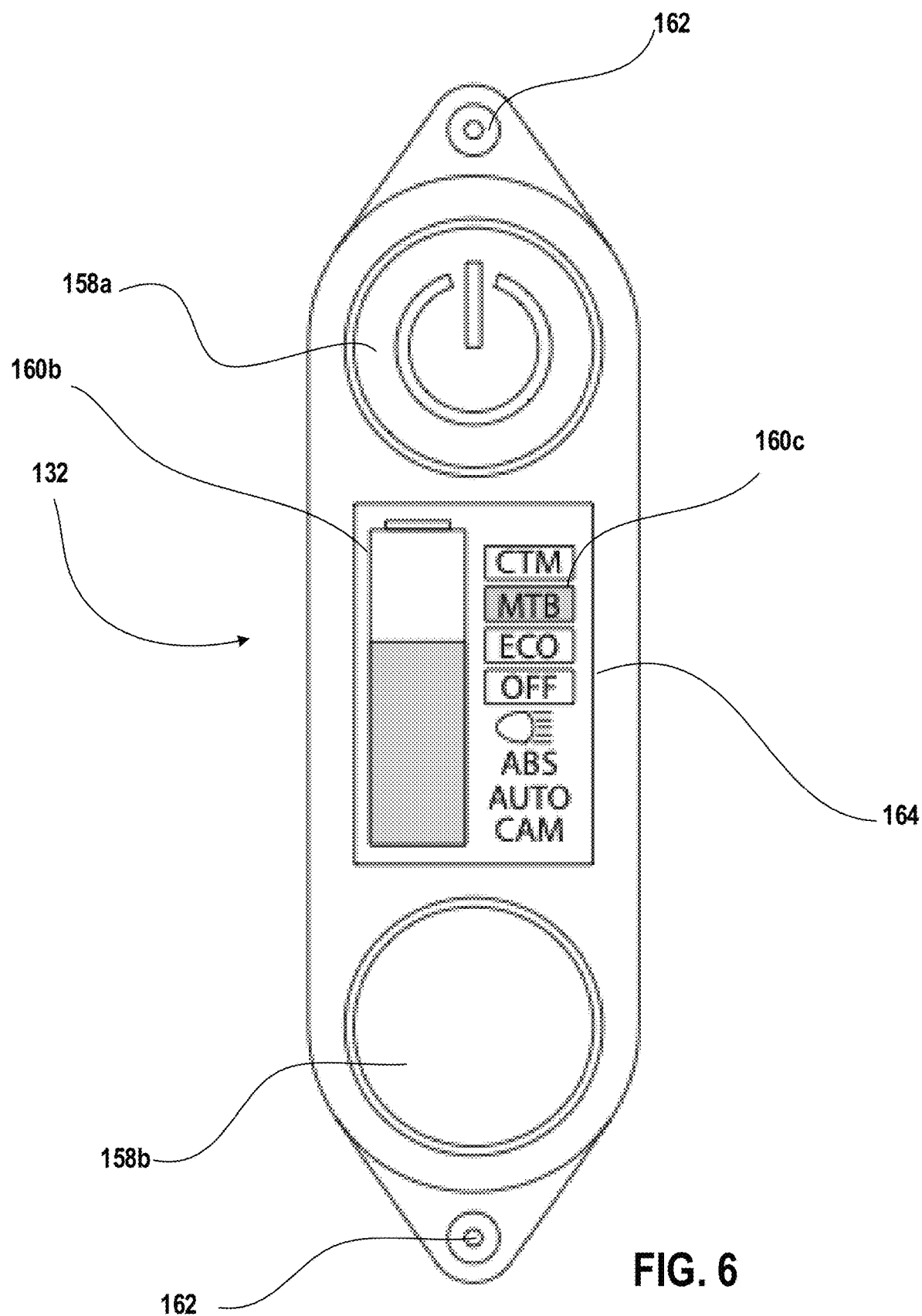
FIG. 6 is a front view of an example of an interface.

In the example shown in FIG. 6, the interface 132 includes two inputs 158 (e.g., the first input button 158a and the second input button 158b) and a single display 164 (e.g., to display one or more of the outputs 160). The first input button 158a, for example, is a main switch that turns the assist motor 146 on and off, and the second input button 158b, with a short press, switches an assist level of the assist motor 146 (e.g., OFF, ECO, EMTB, Custom). The display 164 displays the second output 160b, battery level, the third output 160c, and the power mode. The display 164 illustrates a battery level, via the second output 160b, of over 50% with a partially filled graphic of a battery, and illustrates the power mode, via the third output 160c, with a highlighted mode (e.g., MTB). The display 164 also displays other information that may be useful to the rider. Data for such displayed information may be received by the interface 132 wirelessly or via wired connection from any number of components of the bicycle 100.

The inputs 158 of the interface 132 may, however, serve dual purposes depending on the method of actuation. For example, the same button (e.g., the second button 158b) may change assist levels when pressed and released momentarily (e.g., approximately one second) but may execute a pairing program when pressed for a defined period of time (e.g., five or more seconds).

In one embodiment, the function of each of the inputs 158 may be changed through the use of a setup tool such as a phone app, a computer program, or a series of operations on the bicycle 100 that change the interface 132 into a setup mode where button functions are defined and changed. Similarly, display options may be programmed in the same way. The user may change display settings to modify content, graphic design, intensity, and duration of the information shown on the display 164, for example.

Figure 7:
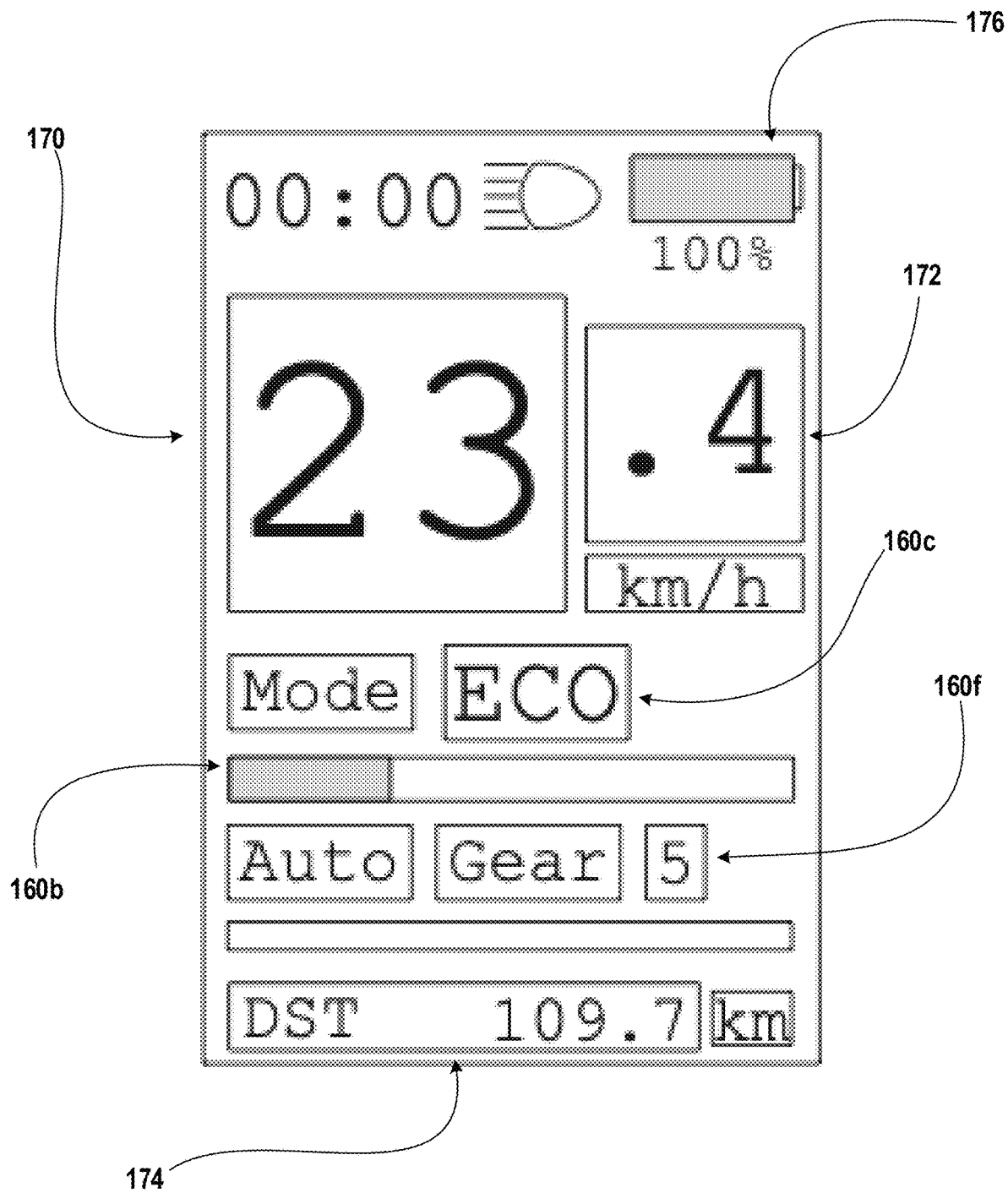
FIG. 7 is a front view of an example of a separate display device.

In one embodiment, the outputs 160 may also be wirelessly transmitted to and displayed on a separate display mounted to the handlebar 104 or another wireless device (e.g., a mobile device such as a cellular phone) not attached to the bicycle 100. The outputs 160 may be displayed on the separate display instead of or in addition to being displayed at the interface 132. Referring to FIG. 7, a separate display 170 displays the battery level 160b, the power mode 160c, and the gear 160f with other information such as, for example, a speed 172, a distance traveled 174, and a battery level 176 for the separate display 170.

In one embodiment, the interface 132 includes an ambient light sensor configured to automatically adjust a brightness of one of the displays (e.g., a single OLED display that displays all of the outputs 160), such that the displayed outputs 160 may be visible in bright ambient conditions and not distracting or blinding in low ambient light conditions. For example, an LED on the interface 132 may be used to sense the ambient light level. In one embodiment, the ambient light sensor may be used to automatically turn on the bike headlights/taillights below a certain ambient light threshold.

The interface 132 may wirelessly communicate with, for example, a passive wireless electronic device (e.g., a wireless key fob) carried by an owner of the bicycle 100 as a security measure. If the interface 132 detects that the wireless key fob is in sufficient proximity to the bicycle 100, all e-bike functions may be enabled. If the interface 132 does not detect the key fob, the e-bike functions may be disabled to prevent theft. In one embodiment, a cell phone associated with the owner may be used interchangeably with a key fob as an unlocking device The controls and display on the interface 132 may serve as the primary and only controls to the e-bike control system 128. In one embodiment, redundant controls may be provided on the handlebar 104 through the use of wireless input devices. In this way, a control such as control of the power output of the assist motor may be controlled at the interface 132 or the wireless remote at the handlebar 104. However, if the remote button is used in such a configuration, the interface 132 acts as a bridge; a signal generated by the remote button is transmitted wirelessly to the interface 132, and the interface 132 then communicates the generated signal to the e-bike control system 128. In this way, the interface 132 may control the same characteristic of the e-bike 100 through multiple inputs.

Figure 8:
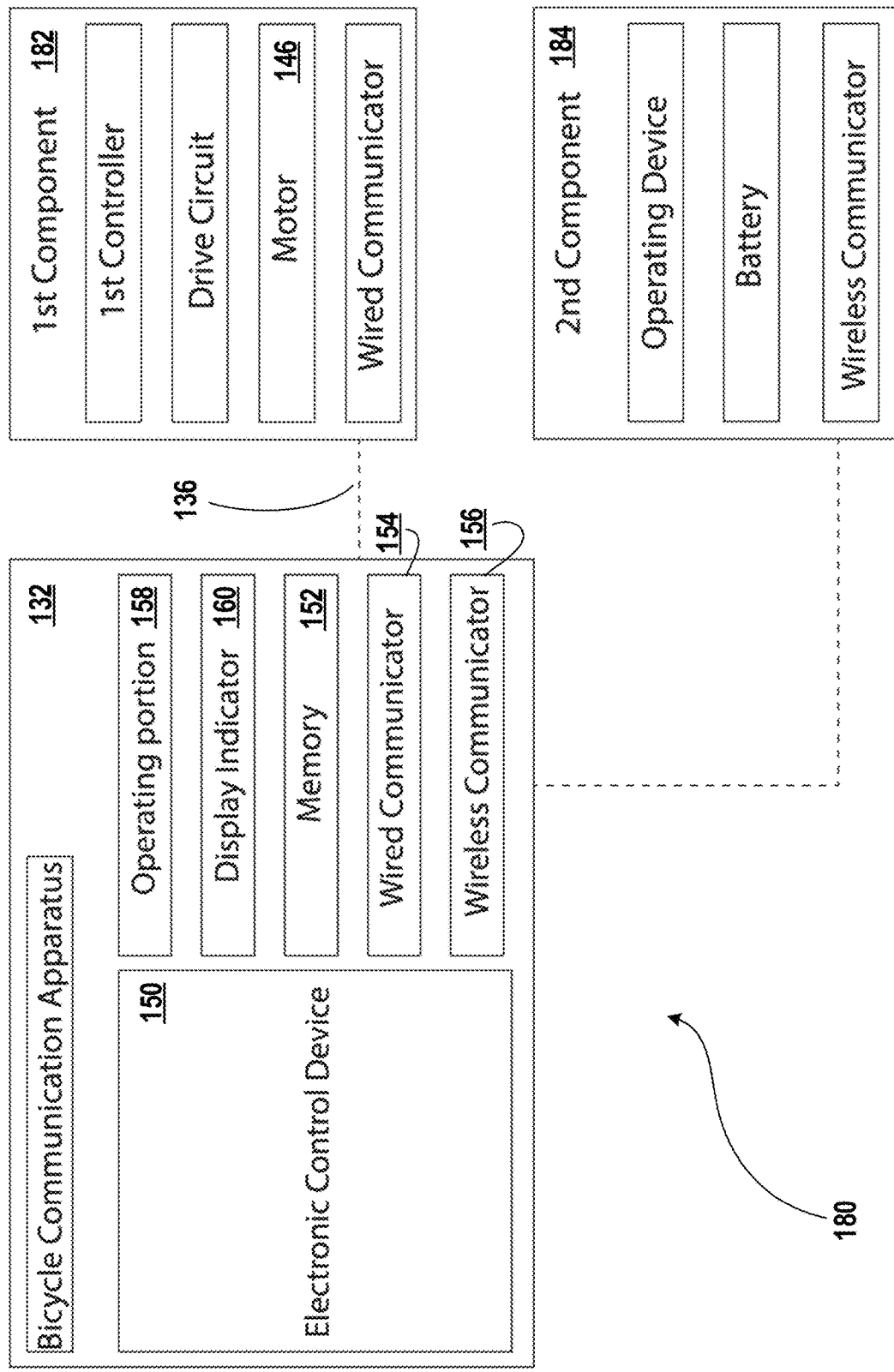
FIG. 8 is a representation of a first example of an e-bike system.

FIG. 8 is a schematic showing a simplified representation of an e-bike system 180 including an embodiment of the interface 132. The interface 132 is connected by wire 136 to a first component 182 (e.g., the e-bike control system 128 including the battery 130 (not shown), and the assist motor 146 of the drive unit 138). The interface 132 is connected wirelessly to a second component 184 (e.g., a walk or boost button mounted to the handlebar 104). In this way, all the complicated functionality of inputs and displays are directly wired to the interface 132 and mounted on the bicycle frame 104, operable and visible to the bike rider with a large supply of power from the battery 130 of the e-bike control system 128. In this way, the display 164 remains on and may be very bright, while minimizing a risk of wearing out the battery 130. The second component 184, which is located at the handlebar 104, may only transmit a wireless signal momentarily when actuated and may therefore be configured with a very small power supply and therefore be a very small device. This may allow the second component 184 to easily integrate into other handlebar-mounted devices such as shifters, brake levers, seat post controls, or even the handlebar 104 itself. The e-bike system 180 may include more, fewer, and/or different components.

Figure 9:
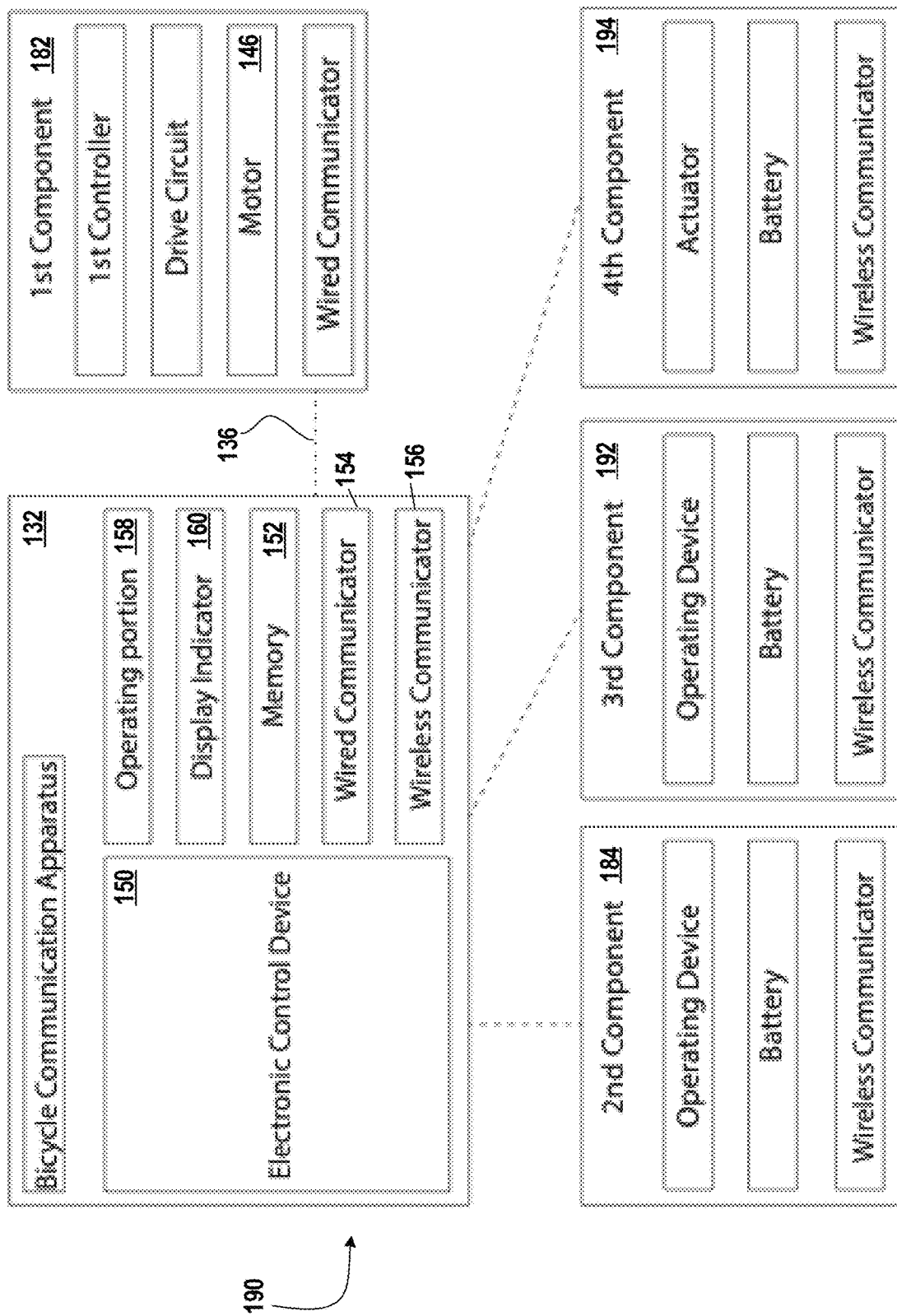
FIG. 9 is a representation of a second example of an e-bike system.

FIG. 9 is a more complicated schematic of an e-bike system 190 adding a third component 192 and a fourth component 194 to be controlled by the interface 132. The third component 192 and the fourth component 194 may be wired or wirelessly powered. The third component 192 and the fourth component 194 may be wired or wirelessly controlled. The third component 192 and the fourth component 194 may include electronic derailleurs (e.g., the rear derailleur 122), height adjust seat posts, suspension devices such as suspension seat posts, front shocks, rear shocks or suspension frame elements. Additional devices may be accessories such as lights, speakers, air pressure control systems, cameras, or any other security related devices such as locks. The e-bike system 190 may include more, fewer, and/or different components.

Figure 10:
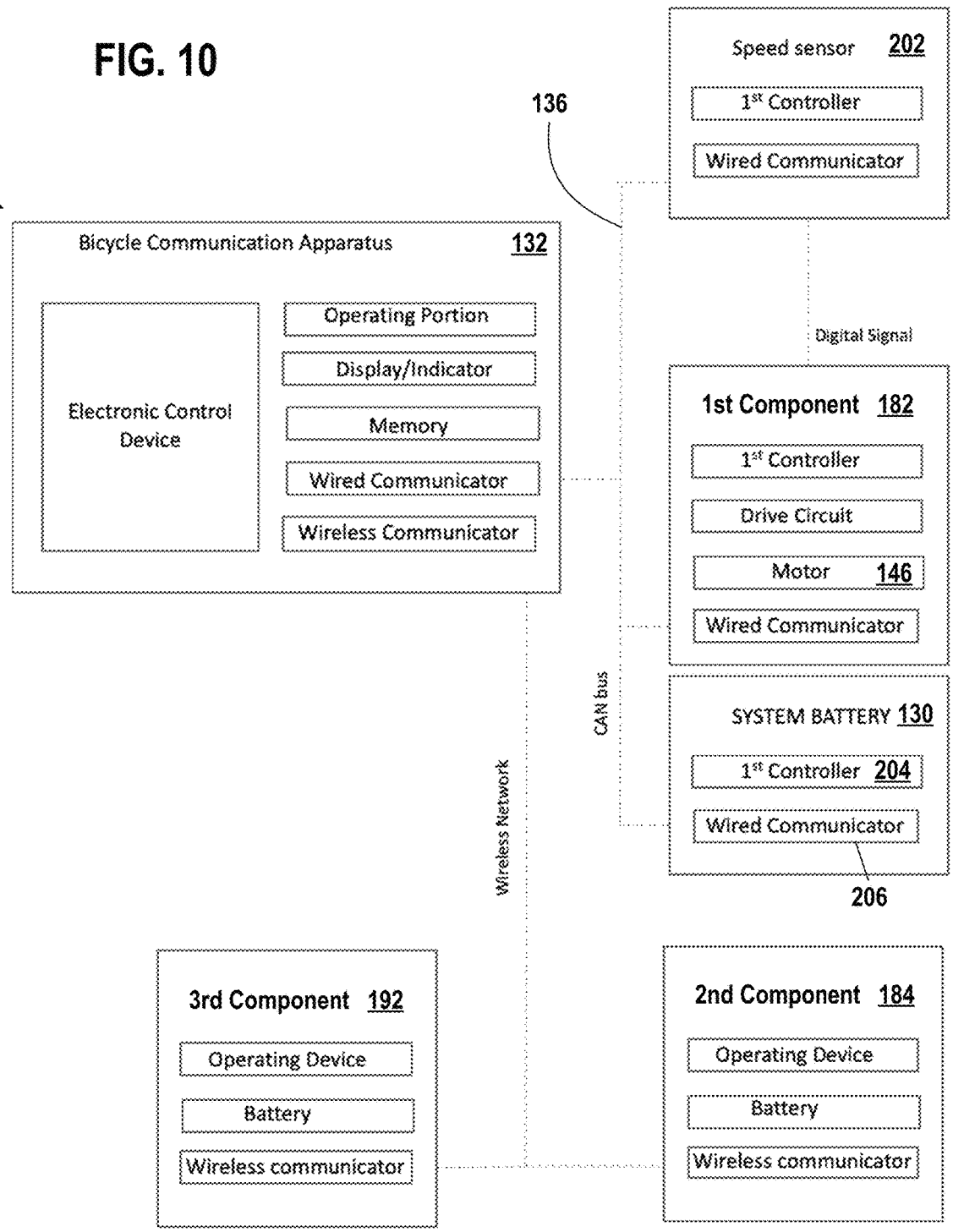
FIG. 10 is a representation of a third example of an e-bike system.

FIG. 10 is a schematic of another e-bike system 200, adding the third component 192, the battery 130 (e.g., a system battery), and a sensor 202 compared to the example shown in FIG. 8. In the example, the first component 182 is the drive unit 138. The system battery 130 may include a controller 204 (e.g., a microprocessor) and a wired communicator 206 (e.g., a wired interface). In an alternate embodiment, the communicator 206 may be a wireless communicator. The microprocessor 204 may track any number of parameters including, for example, battery voltage, battery temperature, current from battery, battery state of charge, individual cell voltage, charge cycles, on time, and/or any number of other parameters. The microprocessor 204 may control an output of the battery 130 (e.g., on/off, max current, voltage, etc.) to the rest of the e-bike system 200 based on these or other measured parameters.

The wired communicator 206 of the battery 130 may be, for example, a CAN bus type. The wired communicator 206 may send, for example, status information to the rest of the e-bike system 200 and/or a charging system about a state of the battery (e.g., voltage, temperature, state of charge, individual cell voltage, serial number, etc.). In one embodiment, the microprocessor 204 and the wired communicator 206 are used to authenticate the battery 130 to the rest of the e-bike system 200 to prevent third party batteries from being used in the e-bike system 200. The wired communicator 206 may be used to provide a firmware update to the microprocessor 204 to change the behavior of the battery 130. The wired communicator 206 of the battery 130 may communicate with all other devices on the wired CAN bus (e.g., the HMI 132, the drive unit 138, the sensor 202, etc.).

Typically, e-bike speed sensors may communicate with the drive unit 138 with a timed digital pulse. This pulse may be referred to as a reed signal. This pulse may correspond with a single revolution of a wheel (e.g., the front wheel 108 or the rear wheel 112). The time between pulses may be used by the drive unit 138 to calculate wheel speed. Wheel speed data is used by the drive unit 138 to prevent providing motor assist to the rider above a legal speed threshold. Various system certification and safety designs may make it difficult to deviate from this legacy digital timing pulse. In the case of automatic shifting, it is desirable to have a wheel speed update rate that is higher than one pulse per revolution of the wheel.

The sensor 202 is, for example, a speed sensor that is capable of updating at a higher rate than once per revolution of the wheel. The speed sensor 202 reports the speed data asynchronously to consumers of the speed data (e.g., the HMI 132) without having to change an interface to the drive unit 138. For example, the asynchronous data may be transmitted on the CAN bus. Accordingly, the e-bike system 200 may employ any combination of CAN bus speed data broadcast to all devices on the CAN bus and/or a digital timed pulse interface between the speed sensor 202 and the drive unit 138 directly.

Figure 11:
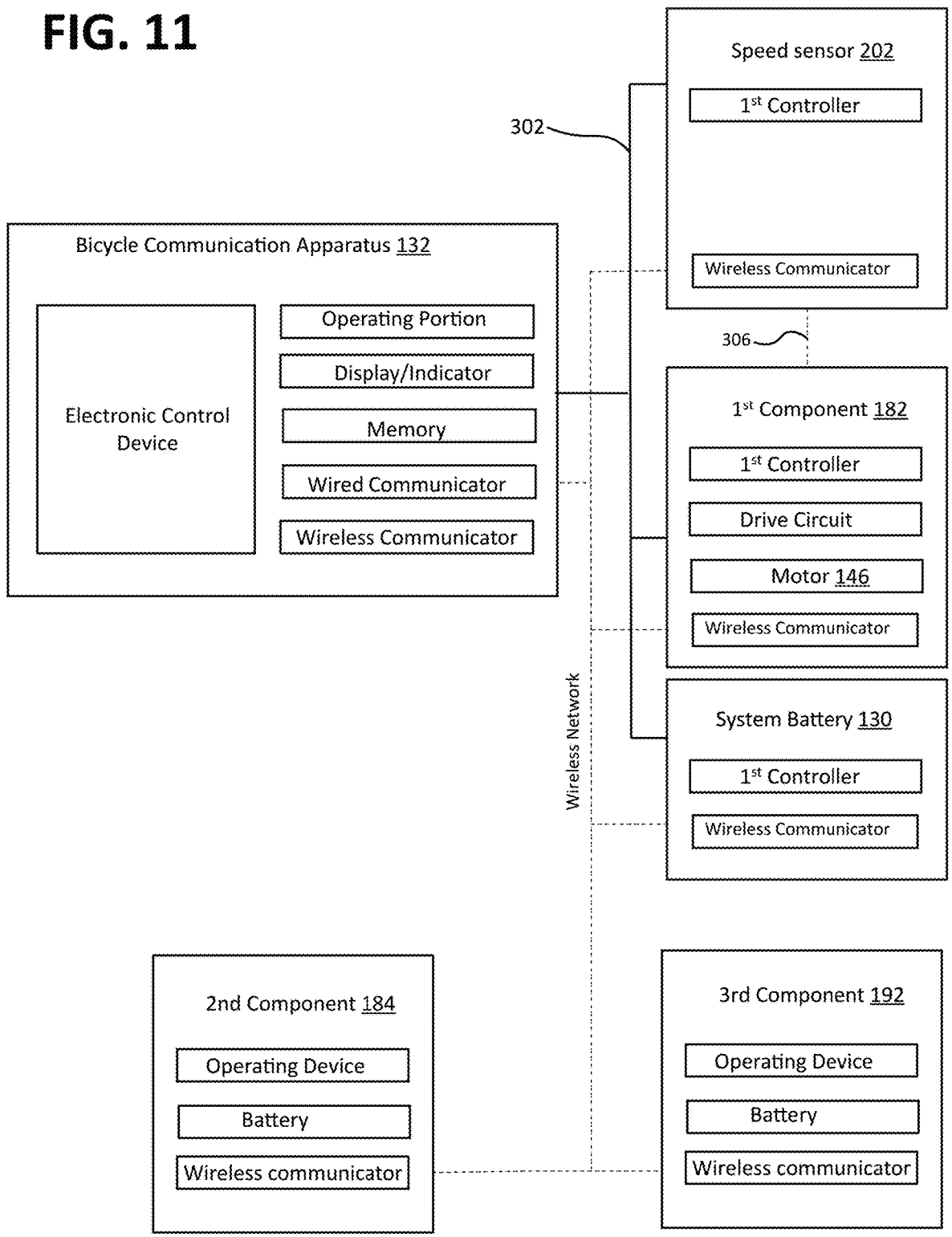
FIG. 11 is a representation of a fourth example of an e-bike system.

It may be desirable to power many or all electronic subsystems on an e-bike from the battery 130 to minimize the number of batteries requiring recharge or replacement. Additionally, accomplishing communication between devices wirelessly may be desirable to reduce the complexity of physical interconnects between devices, even if they already include power connections between components. In another embodiment, as illustrated in FIG. 11, all subsystems communicate wirelessly, as indicated by the dotted line. For example. the subsystems communicating wirelessly may include, but are not limited to, the bicycle communication apparatus (HMI) 132, the speed sensor 202, the first component (drive unit) 182, the system battery 130, the second component 184, and the third component 192. Several subsystems are powered by the system battery 130 with wires 302. For example, the system battery 130 may provide power to the bicycle communication apparatus (HMI) 132, the speed sensor 202, the first component (drive unit) 182. Other subsystems or devices may be connected to the system wirelessly and may include a separate power source or receive power from a separate power source than the system battery 130. The speed sensor 202 is optional in the embodiments of FIGS. 10 and 11. The speed sensor 202 may optionally have a wired digital interface to the motor 146 in the first component 182, providing a digital signal 306. Additionally, the battery 130 may report state of charge, temperature, or other telemetry to a battery charger wirelessly during charging process.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. An interface comprising:
   a housing attachable to a first frame part of a bicycle having an e-bike motor system;
   a processor supported by the housing;
   a first communication interface and a second communication interface in communication with the processor, wherein the first communication interface is a wired communication interface, and the second communication interface is a wireless communication interface; and
   an input in communication with the processor and supported by the housing, the input being configured to generate a first control signal based on a first user input,
   wherein the processor is configured to:
      receive a second control signal via the second communication interface, the second control signal being generated by a control device attached to a second frame part of the bicycle based on a second user input; and control the e-bike motor system via the first communication interface, based on the first control signal and the received second control signal, the first control signal and the second control signal causing the e-bike motor system to perform different operations.

2. The interface of claim 1, wherein the first frame part is a top tube of the bicycle, and the second frame part is a handlebar of the bicycle.

3. The interface of claim 1, wherein the input is a physical user interface.

4. The interface of claim 1, wherein the processor is further configured to receive data representing characteristics related to the e-bike motor system from the e-bike motor system via the first communication interface.

5. The interface of claim 4, further comprising an output in communication with the processor, wherein the output is configured to output a representation of at least one of the characteristics related to the e-bike motor system.

6. The interface of claim 5, wherein the output is a display supported by the housing, and
wherein the display is configured to display the representation of the at least one characteristic related to the e-bike motor system.

7. The interface of claim 6, further comprising an ambient light sensor configured to determine an amount of ambient light in an environment in which the interface is disposed,
wherein the processor is configured to change a brightness of the display based on the determined amount of ambient light in the environment.

8. The interface of claim 6, wherein the e-bike motor system includes a drive motor and a battery, and
wherein the characteristic displayed related to the e-bike motor system include battery power, a time to complete a charge, a charge rate, a percent state of charge, a system warning or error message, or any combination thereof.

9. The interface of claim 8, wherein the display includes displaying a representation of multiple characteristics of the e-bike motor system.

10. The interface of claim 1, wherein e-bike motor system includes a battery, and
wherein the processor is configured to be powered by the battery of the e-bike motor system via the first communication interface.

11. The interface of claim 10, wherein the e-bike motor system further includes a drive motor, and
wherein the processor is configured to control the drive motor of the e-bike motor system via the first communication interface, based on the first control signal or the received second control signal.

12. The interface of claim 11, wherein the control of the drive motor of the e-bike motor system based on the first control signal or the received second control signal comprises the processor being configured to turn the drive motor on or off, or change a power level of the drive motor.

13. The interface of claim 1, wherein the control device attached to the second frame part of the bicycle is a wireless handlebar mounted e-bike control interface, a wireless handlebar mounted shifter or seat post control interface, a wireless handlebar mounted e-bike assist level control interface, or a wireless handlebar mounted automatic shifting control interface.

14. The interface of claim 13, wherein the e-bike motor system is a first component, and wherein the processor is further configured to receive data from a second component of the bicycle, transmit data to the second component of the bicycle, or receive and transmit data to the second component of the bicycle.

15. The interface of claim 14, further comprising a third communication interface in communication with the processor, the third communication interface being a wireless communication interface,
wherein the processor is configured to receive the second control signal via the second communication interface using a first wireless communication protocol, and
wherein the processor is configured to receive data from the second component of the bicycle, transmit data to the second component of the bicycle, or receive and transmit data to the second component of the bicycle via the third communication interface using a second wireless communication protocol, the second wireless communication protocol being different than the first wireless communication protocol.

16. The interface of claim 14, wherein the second component of the bicycle is a wirelessly controlled derailleur, a wirelessly controlled front suspension fork, or a wirelessly controlled rear suspension shock.

17. The interface of claim 13, wherein the e-bike motor system is a first component, and the first component receives a timed digital pulse from a speed sensor, the speed sensor communicates to the processor via the first communication interface.

18. The interface of claim 1, wherein the processor is configured to communicate with a device outside of the bicycle via the second communication interface or a third communication interface, the third communication interface being different than the second communication interface and being a wireless communication interface,
wherein the processor is further configured to:
identify whether a signal from the device outside of the bicycle is received; and
allow operation of the e-bike motor system when the signal is received from the device outside of the bicycle.

19. The interface of claim 18, wherein the device outside of the bicycle is a passive wireless electronic device or a mobile device.

20. A bicycle communication apparatus for an e-bike, the bicycle communication apparatus comprising:
a housing attachable to a top tube of a frame of a bicycle;
a processor supported by the housing;
a wired communication interface in communication with the processor, the wired communication interface being wiredly connectable to an e-bike motor system, the e-bike motor system including a drive motor;
a wireless communication interface in communication with the processor, the wireless communication interface being wirelessly connectable to a control device attached to a handlebar of the bicycle;
an input supported by the housing and in communication with the processor, the input being configured to generate a first control signal based on a first user input;
wherein the processor is configured to:
receive a second control signal from the control device attached to the handlebar of the bicycle via the wireless communication interface, the second control signal being for the e-bike motor system and being generated by the control device based on a second user input; and control the drive motor of the e-bike motor system via the wired communication interface, based on the first control signal or the received second control signal, the first control signal and the second control signal cause the drive motor to perform different operations.

21. The bicycle communication apparatus of claim 20, wherein the wireless communication interface is a first wireless communication interface,
- wherein the bicycle communication apparatus further comprises a second wireless communication interface, the second wireless communication interface being in communication with the processor and being wirelessly connected to a movable component of the bicycle, the movable component of the bicycle being movable relative to the bicycle communication apparatus, and
- wherein the processor is in communication with the control device attached to the handlebar of the bicycle and the movable component of the bicycle using different wireless protocols, respectively.

22. An e-bike system for a bicycle, the e-bike system comprising:
- an e-bike motor system comprising a drive motor and a battery; and
- a bicycle communication apparatus comprising:
  - a housing attachable to a frame of the bicycle;
  - a processor supported by the housing;
  - a wired communication interface in communication with the processor, the wired communication interface being wiredly connected to the e-bike motor system;
  - a wireless communication interface in communication with the processor, the wireless communication interface being wirelessly connectable to a control device attached to a handlebar of the bicycle;
  - an input supported by the housing and in communication with the processor, the input being configured to generate a first control signal based on a first user input;
- wherein the processor of the bicycle communication apparatus is configured to:
  - receive a second control signal from the control device attached to the handlebar of the bicycle via the wireless communication interface, the second control signal being generated by the control device based on a second user input; and
  - control the drive motor of the e-bike motor system via the wired communication interface, based on the first control signal or the received second control signal the first control signal and the second control signal cause the drive motor to perform different operations.

* * * * *